United States Patent

Welch et al.

[11] Patent Number: 5,857,605
[45] Date of Patent: Jan. 12, 1999

[54] VACUUM ASSISTED WEB DRIVE FOR CORRUGATOR DOUBLE BACKER

[75] Inventors: Harold D. Welch, Phillips; Matthew A. Tourdot, McFarland; Paul A. Garvoille, Cambridge; Carl R. Marschke, Phillips, all of Wis.

[73] Assignee: Marquip, Inc., Phillips, Wis.

[21] Appl. No.: 893,259

[22] Filed: Jul. 17, 1997

Related U.S. Application Data

[60] Continuation-in-part of Ser. No. 670,812, Jun. 25, 1996, Pat. No. 5,706,994, which is a division of Ser. No. 494,327, Jun. 26, 1995, Pat. No. 5,561,918.

[51] Int. Cl.$^6$ ................................................... B65H 20/00
[52] U.S. Cl. ............................................. 226/95; 226/170
[58] Field of Search .............................. 226/95, 170, 194

[56] References Cited

U.S. PATENT DOCUMENTS

| | | | |
|---|---|---|---|
| 3,140,030 | 7/1964 | Stewart | 226/95 |
| 3,266,690 | 8/1966 | Goettsch | 226/95 |
| 3,321,121 | 5/1967 | Nyberg et al. | 226/95 |
| 3,425,610 | 2/1969 | Stewart | 226/95 |
| 5,442,420 | 8/1995 | Tsuji | 226/170 X |
| 5,561,918 | 10/1996 | Marschke | 34/629 |
| 5,706,994 | 1/1998 | Welch et al. | 226/95 |

*Primary Examiner*—Michael Mansen
*Attorney, Agent, or Firm*—Andrus, Sceales, Starke & Sawall

[57] ABSTRACT

A double backer for curing the web bonding adhesive and drying the corrugated paperboard web utilizes a web holddown apparatus for maintaining the web in intimate drying contact with the lower heating units which does not require the use of a driven holddown belt. The web is pulled through the double backer by a downstream vacuum conveyor section comprising a single full width belt to the upper surfaces of which a vacuum is applied. The vacuum drive belt has low friction strips on the underside by which the belt is supported on vacuum plenum support surfaces and a unique pattern of vacuum distribution channels on the other side of the belt which together reduce friction and drive power requirements.

7 Claims, 6 Drawing Sheets

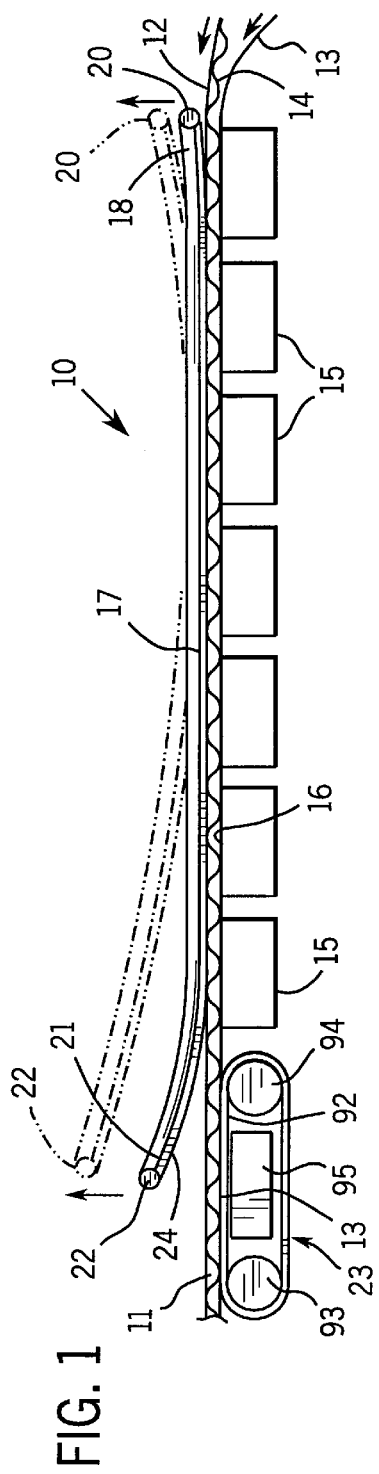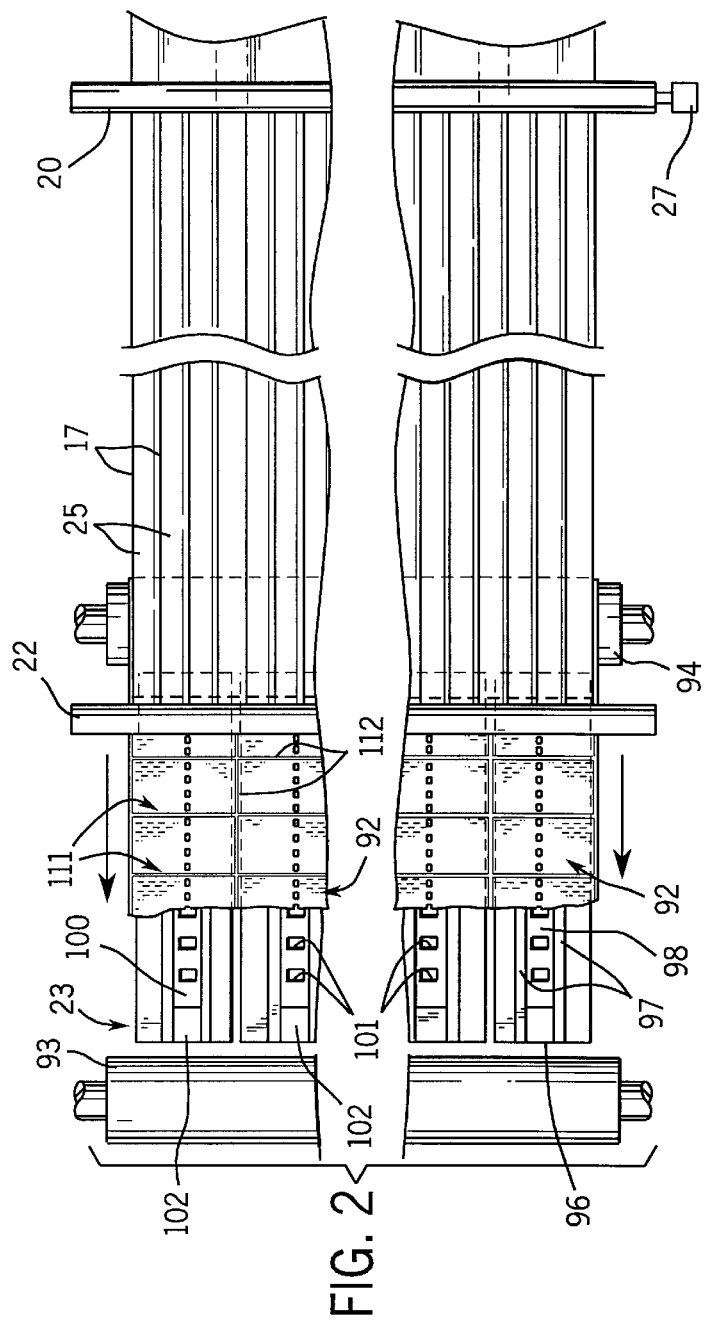

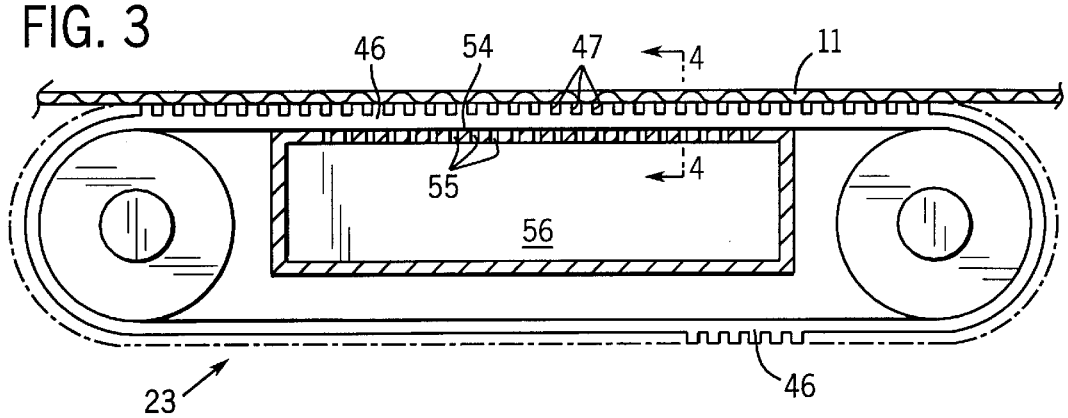
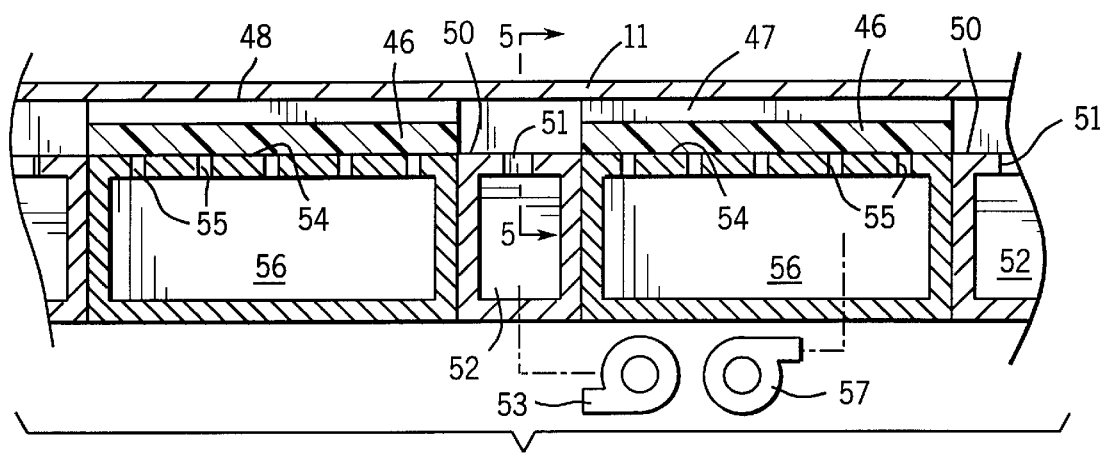
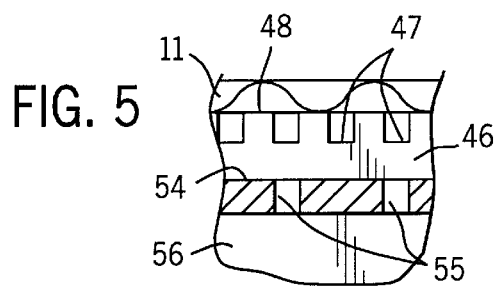

VACUUM ASSISTED WEB DRIVE FOR CORRUGATOR DOUBLE BACKER

This is a continuation-in-part of application Ser. No. 08/670,812, filed Jun. 25, 1996, now U.S. Pat. No. 5,706,994 which is a divisional of application Ser. No. 08/494,327, filed Jun. 26, 1995, now U.S. Pat. No. 5,561,918.

BACKGROUND OF THE INVENTION

The present invention pertains to a double backer for the production of corrugated paperboard and, more particularly, to a double backer in which the conventional driven web holddown belt is eliminated and replaced with a unique vacuum traction device.

In a typical prior art double backer, a liner web is brought into contact with the glued flute tips of a single face corrugated web, and the freshly glued double face web is then passed over the surfaces of a number of serially arranged heating units, usually steam chests, to cause the starch-based glue to set and to drive moisture from the web. Double face web travel over the flat heated surfaces of steam chests is typically provided by a wide driven holddown belt in direct contact with the upper face of the corrugated web. The top face of the belt, in turn, is held in contact with the traveling web by any of several types of weight or force applying devices, well known in prior art. For example, the holddown belt may be engaged by a series of weighted ballast rollers, it may be forced into contact with the web by air pressure from a system of nozzles located over the web, or an arrangement of inflatable air bladders may be operated to press the moving holddown belt into contact with the double face web. It is also known to provide means for varying the ballast load applied to the holddown belt and web, both longitudinally in the machine direction and laterally in the cross machine direction.

The use of a driven holddown belt in a double backer has a number of attendant disadvantages. The holddown belt must be mounted for continuous travel in the manner of the conventional continuous conveyor belt system and, therefore, must also include a separate belt drive means. The holddown belt also must necessarily overlie the entire surface of corrugated web, at least in the heating section, and, as a result, may inhibit the escape of moisture from the board as it dries. Also, the edges of the belt which overhang the edges of the corrugated web run in contact with surfaces of the steam chests or other heating surfaces and are subject to wear.

SUMMARY OF THE INVENTION

A double backer is provided in which the driven holddown belt is eliminated. Stationary holddown strips, extending parallel to one another in the direction of web movement, are supported from above to contact the entire web across its width and along the heating section. A separate downstream vacuum assisted conveyor, in accordance with the present invention, is used to pull the corrugated web through the heating section.

The vacuum assisted conveyor apparatus includes a continuous web transport belt which underlies and supports the web across its lateral width, and means are provided for driving the belt. The belt preferably includes spaced raised protrusions on the upper belt surface, which protrusions have flat surface portions defining a web contacting surface, said protrusions defining open channels therebetween. Openings in the belt provide communication between the lower belt surface and the upper belt surface, including the channels. A vacuum source is operatively connected to the openings to supply negative pressure to the upper belt surface channels sufficient to hold the web to the moving belt. In the preferred embodiment, the raised protrusions comprise a series of discrete support elements, and the channels extend between the support elements both longitudinally and laterally over the belt. The channels are interconnected in this embodiment.

A uniquely constructed transport belt and vacuum plenum system, in accordance with the present invention, is constructed to provide a vacuum assisted conveyor apparatus for moving a web of material. The system comprises a continuous web transport belt that includes an upper conveying run which underlies and supports the web across its lateral width, and a lower return run. Means are provided for driving the belt that include a drive pulley engaging the inner belt surface and providing a transition between the conveying run and the return run. The belt has outer flat surface portions on the upper surface of the conveying run which define a web contacting surface. The surface portions define therebetween open channels. Laterally spaced lines of longitudinally ending openings are formed in the belt to provide communication between the inner belt surface and the channels in the conveying run of the upper belt surface. A support structure underlies the conveying run of the belt and provides sliding support for the driven belt, the support structure including a series of parallel laterally spaced vacuum plenums which define belt support surfaces extending the length of the conveying run. A vacuum source is operatively connected to the plenums to supply negative pressure to the channels. Longitudinal vacuum distribution means are provided in each support surface and connected to the vacuum source. One line of belt openings is aligned with each of the vacuum distribution means. The inner belt surface has a series of parallel laterally spaced longitudinally extending low friction strips which are positioned to engage the belt support surfaces. A high friction strip is positioned between each adjacent pair of low friction strips. The high friction strips are adapted to be engaged by the drive pulley.

The vacuum distribution means in each of the belt support surfaces comprises a longitudinal vacuum slot which extends substantially the full length of the support surface, a recessed vacuum surface in the slot below the support surface, and a series of longitudinally spaced vacuum openings in the vacuum surface. In the preferred embodiment, the total area of the belt support surfaces comprises less than about 20% of the total area of the support structure underlying the conveying run.

The open channels which are defined by the pattern of discrete raised support elements preferably having a maximum width of about 0.25 inch. The flat upper surface portions on the conveying run of the belt, which define the web contacting and support surface, preferably comprise less than about 40% of the outer surface area of the belt.

BRIEF DESCRIPTION OF THE DRAWINGS

FIG. 1 is a side elevation of double backer showing schematically the web drive of one embodiment of the present invention;

FIG. 2 is a top plan view of FIG. 1;

FIG. 3 is a side elevation of one embodiment of the drive conveyor of the present invention;

FIG. 4 is a partial sectional view taken on line 4—4 of FIG. 3;

FIG. 5 is a partial sectional view taken along line 5—5 of FIG. 4;

DETAILED DESCRIPTION OF THE PREFERRED EMBODIMENTS

Figure 6:
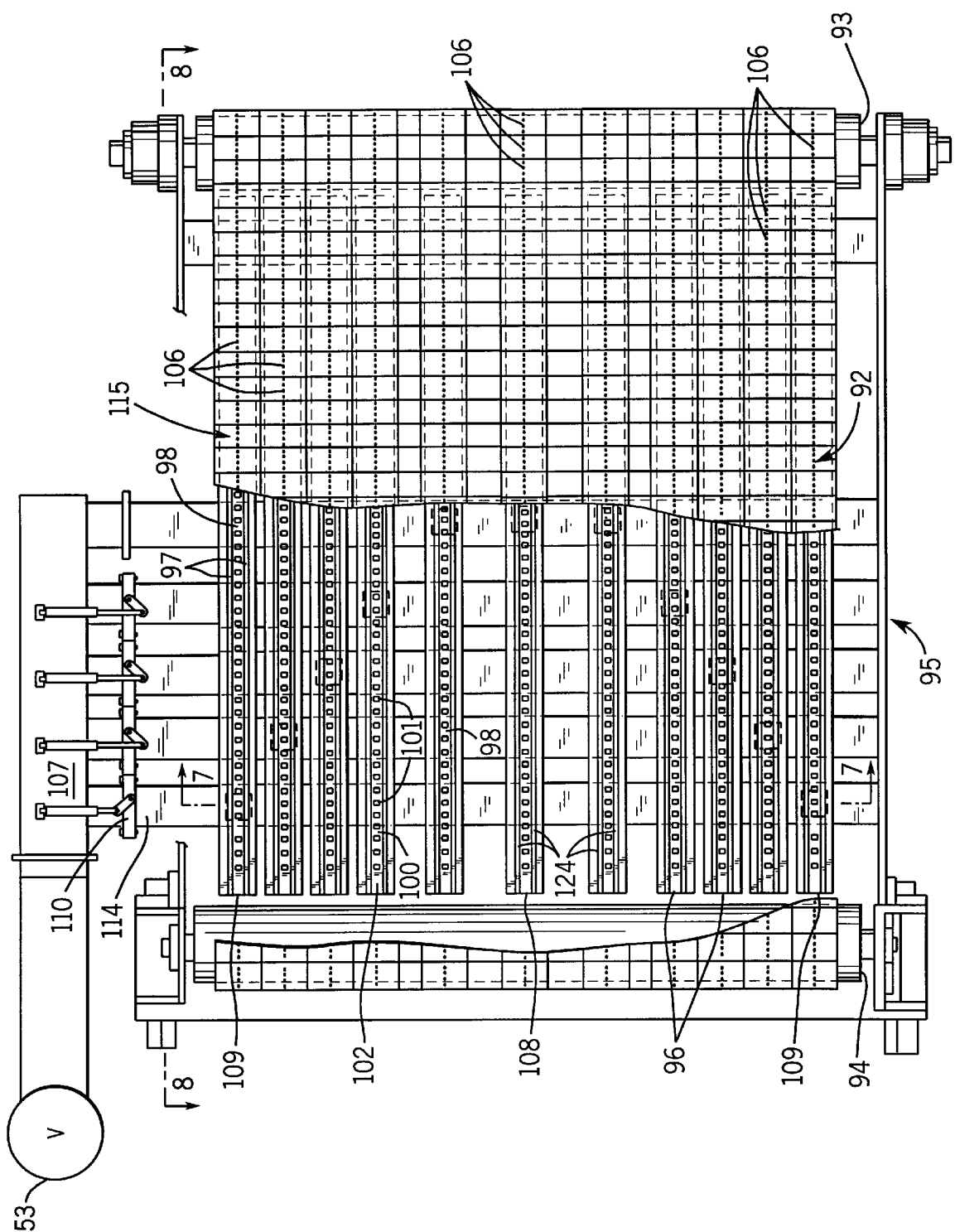
FIG. 6 is a detailed top plan view of the embodiment of the web drive apparatus at the downstream end of the double backer shown in FIG. 2.

Referring initially to FIGS. 1 and 2, there is shown in generally schematic form a double backer 10 including web drive of one embodiment of the invention. In the double backer, a double face corrugated web 11 is formed by joining a single face corrugated web 12 and a liner web 13. The glue tips of the corrugated medium 14 of the single face web 12 are covered with a starch-based adhesive in an upstream glue machine (not shown) and the adhesive bond between the glue tips and the liner 13 is cured by the application of heat and pressure in the double backer 10.

Heat is supplied by a series of heating units 15 having flat, coplanar heating surfaces 16 over which the web 11 travels through the double backer. The heating units typically comprise individual steam chests which are fabricated of a heavy-walled cast iron or steel construction, but may as well comprise any suitable flat heated surface. Each steam chest has an open interior to which high pressure steam is supplied in a known manner and utilizing a supply system which is not shown in the drawings. Each heating unit 15 may be 18 to 24 inches (about 45–60 cm) in length (in the direction of web movement) and have a width in the cross machine direction sufficient to fully support the maximum width of corrugated web to be processed, e.g. 96 inches (about 245 cm). The total length of the heating section provided by a series of heating units may be, for example, 30 feet (approximately 9 m).

A series of flexible parallel metal strips 17 is suspended above the heating section in a manner such that the sag or catenary in the strips allows them to lie atop the double face web 11 and provide the holddown force necessary to facilitate uniform heating and drying of the web and curing of the adhesive. The strips 17 may, for example, be made of stainless steel with a width of 1 inch (about 2.5 cm) or greater and a thickness of 0.040 inch (about 1 mm). A sufficient number of strips must be utilized to provide an overall holddown width in the cross machine direction sufficient to cover the full width of web being processed. The strips are preferably mounted to be quite closely spaced so that substantially full coverage of the web 11 is provided. The upstream ends 18 of the strips are attached to a common upstream support 20 and the downstream ends 21 are attached to a common downstream support 22.

In the FIG. 1 embodiment, the upstream support 20 is positioned just upstream of the upstream-most heating unit 15 just above the incoming single face and liner webs 12 and 13. In this manner, there is only a very short catenary portion which sags downwardly under the influence of gravity and is not in contact with the web 12 in the heating section. The downstream support 22 may extend a greater distance downstream of the downstream-most heating unit 15 to a point over the web drive conveyor 23, to be described in greater detail hereinafter. The downstream support 22 may also be positioned at a somewhat elevated position with respect to the upstream support 20, such that a downstream catenary portion 24 does not contact the web along the drive conveyor 23. Either or both of the strip supports 20 and 22 may be mounted for adjustable vertical movement, as indicated by the arrows in FIG. 1. By raising one or both of the supports, the respective ends 18 and 21 of the strips may also be raised to vary the length of the strips resting upon and in contact with the double face web 11. In this manner, the amount of heat transferred to and the amount of holddown force imposed upon the moving double face web 11 may be adjusted as desired.

FIGS. 3–5 show details of the construction and operation of one embodiment of the drive conveyor 23 which may be used with the previously described double backer. The drive conveyor comprises a series of parallel, laterally spaced transport belt sections 46. The drive surface of each belt section 46 is ribbed to define laterally extending grooves or channels 47 between generally flat topped web supporting crowns 48. The spaces between adjacent vacuum belts 46 are defined by a series of shallow slots 50, the bottom surfaces of which are provided with a line of vacuum supply holes 51. The slots 50 provide open communication between the grooves 47 in the transport belts and the vacuum supply holes in the slots which define the upper surfaces of a series of vacuum plenums 52. The vacuum plenums are connected to a suction blower 53 to provide the required negative pressure. With the traveling double face web 11 in contact with the crowns 48 in the transport belts, the negative pressure is distributed evenly through the channels 47 and across the whole width of the web. If the web being processed is narrower than the full width of the vacuum drive conveyor 23, appropriate valving can be utilized to shut off the vacuum supplied to the vacuum slots 50 laterally outside the outer edges of the web.

The transport belt sections 46 operate over and in sliding contact with belt support surfaces 54 between the vacuum slots 50. In order to reduce sliding friction and corresponding drive power requirements, the transport belts may be operated upon air bearings formed between the support surfaces 54 and the flat undersides of the belts 46. Thus, the surfaces 54 may be provided with air supply holes 55 through which pressurized air from lower air plenums 56 is supplied to provide the air bearing support. In order to provide an adequate air bearing support, the positive air pressure supporting the belts must be greater than the negative pressure supplying the holddown force for the corrugated web. A second blower 57 may be used to provide the positive air pressure for the air bearings. As shown schematically in FIGS. 3 and 5, the vacuum plenums 52 are suitably connected to the suction side of blower 53, while the air plenums 56 are operatively connected to the outlet of blower 57.

The vacuum assisted web drive 23 of the present preferred embodiment is shown somewhat schematically in the top plan view of FIG. 2 and additional details are shown in FIGS. 6–11. In this embodiment, a single web transport belt 92 operates around a driven head pulley 93 and an idler tail pulley 94 defining the ends of and transitions between an upper conveying run 115 and a lower return run 125. Between the pulleys 93 and 94, the conveying run of the belt is carried on a support structure 95 which includes a vacuum plenum arrangement somewhat similar to the previously described embodiment.

Figure 7:
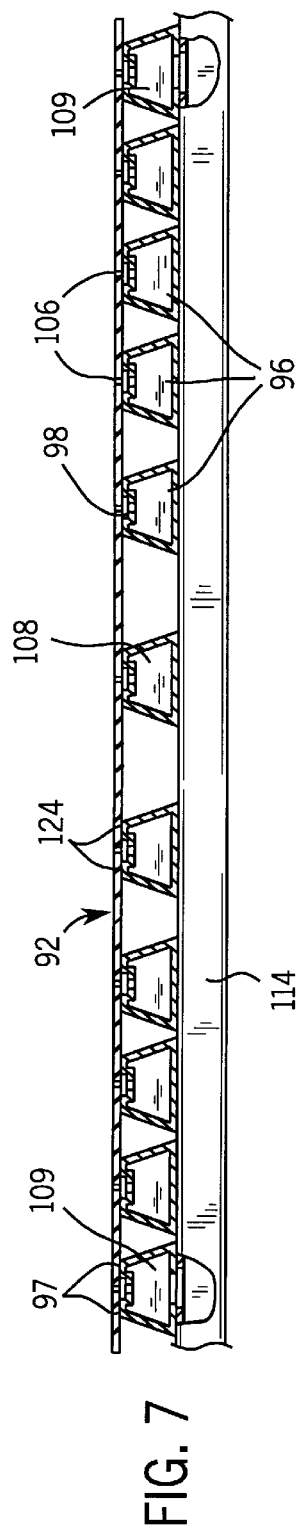
FIG. 7 is a sectional end view taken on line 7—7 of FIG. 6.
Figure 9:
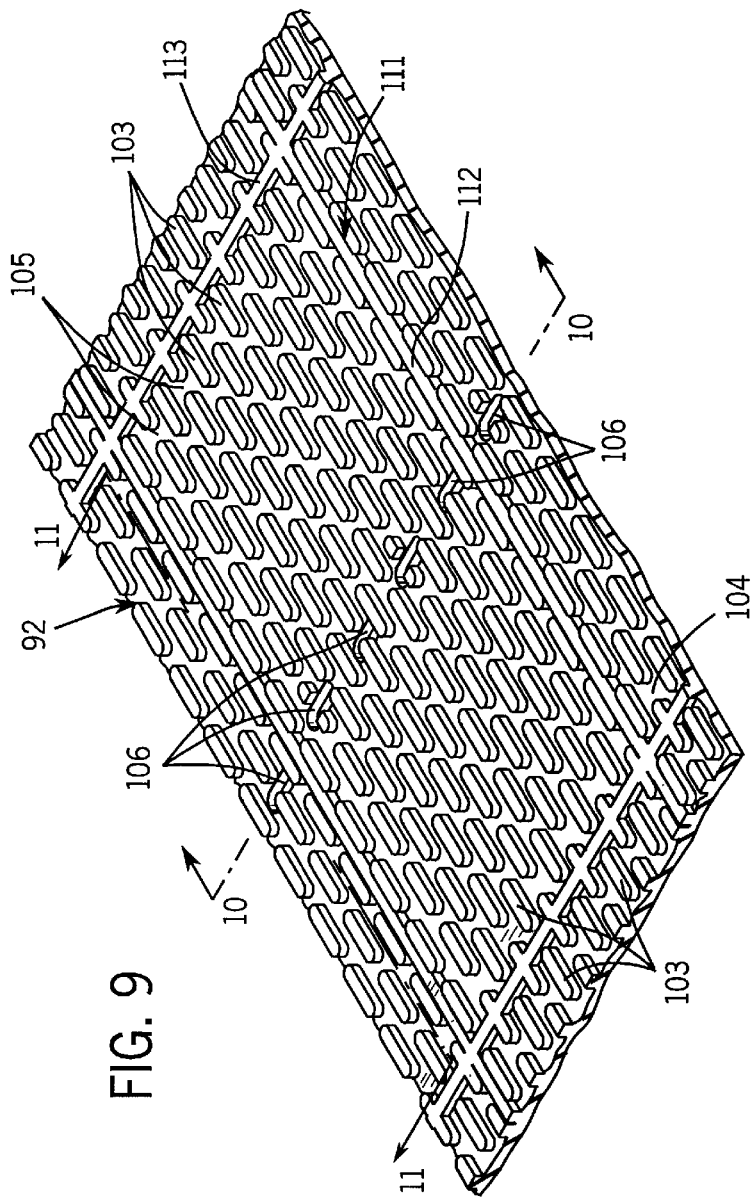
FIG. 9 is a perspective view of a section of the web transport belt of FIG. 6 showing details of its construction.

With reference particularly to FIGS. 6 and 7, the support structure 95 includes a series of longitudinally extending and laterally spaced vacuum plenums 96. The uppermost surface of each plenum provides a support surface 97 for the belt 92. The plenums 96 and support surfaces 97 provided by the plenums extend nearly the full distance in the machine direction between the head and tail pulleys 93 and 94. Centered in each plenum support surface 97 and running nearly the full length thereof is a recessed vacuum distribution slot 98. The bottom of the slot 98 is defined by a plate 100 provided with a series of spaced vacuum openings 101. The openings 101 provide direct communication to the interior of the plenum 96.

The vacuum slots 98 do not run the full length of the support surface 97, but rather are closed on the upstream and downstream ends with end plates 102. The end plates lie coplanar with the support surface 97 and provide additional support for the belt 92 which travels thereover. The end plates 102 also prevent or minimize vacuum loss from the ends of the vacuum slots. By placing the vacuum openings 101 in the bottoms of the recessed distribution slots 98, the holddown force provided by the vacuum is better distributed through the belt 92 as will be described.

Figure 8:
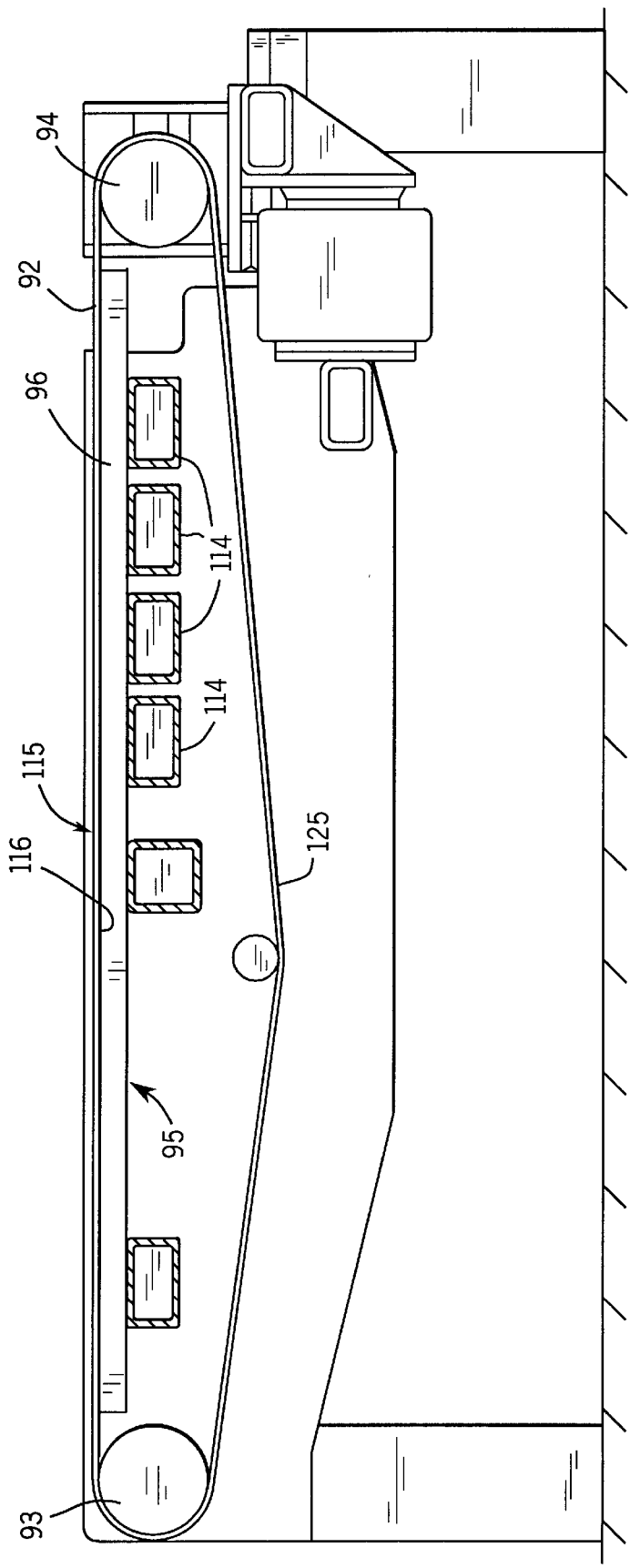
FIG. 8 is a sectional side view taken on line 8—8 of FIG. 6.
Figure 10:
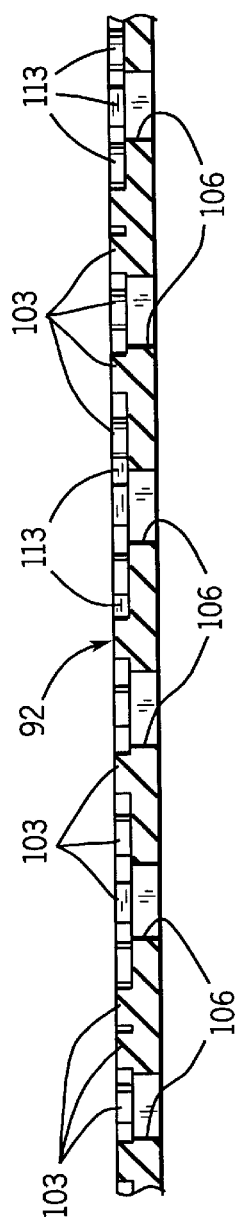
FIG. 10 is a sectional view taken on line 10—10 of FIG. 9.
Figure 11:
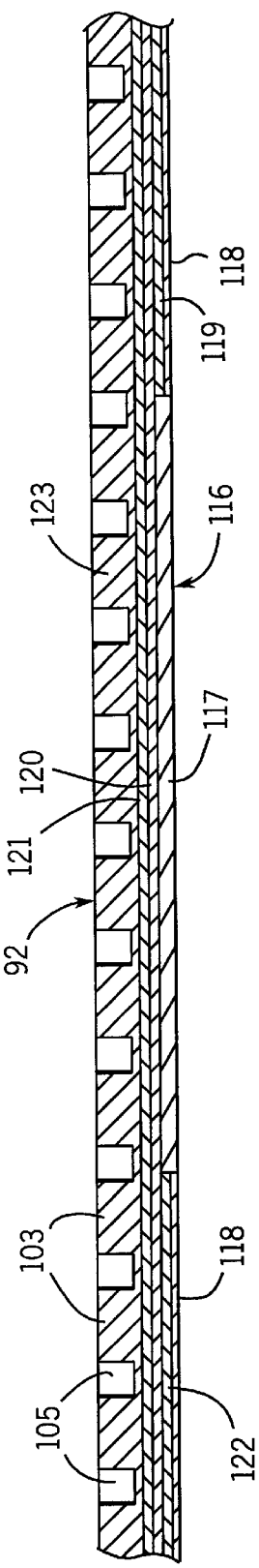
FIG. 11 is a sectional detail taken on line 11—11 of FIG. 9.

The bottom of the web transport belt 92 is essentially flat. Referring, however, to FIGS. 7, 8 and 11, and with reference to the upper conveying run 115 of the belt which carries the web 11, the underside 116 of the conveying run is characterized by a series of parallel laterally spaced longitudinally extending low friction strips 117 which are positioned on the belt to ride upon and be supported by the support surfaces 97 the plenums 96. Between the low friction strips 117, the underside 116 of the belt is comprised of high friction strips 118. The high friction strips provide the necessary frictional engagement with the pulley 93 and, preferably, are raised slightly with respect to the low friction strips 117.

This composite underside 116 of the belt may be created in a number of different manners. With particular reference to FIG. 11, the belt may be made of several fabric plies, including a lower ply 119, an intermediate ply 120, and an upper ply 121. The lower ply 119 is covered on its lower surface with a high friction rubber cover 122. The top side of the belt is also provided with an upper rubber cover 123 which includes a special web support structure which will be described hereinafter.

In the process of manufacturing the belt 92, the underside 116 is cut away in the regions intended to comprise the low friction strips 117, by cutting through the lower rubber cover 122 and the lower fabric ply 119. The low friction strips 117 are glued in the regions cut away leaving therebetween the high friction rubber strips 118. The material comprising the low friction strips 117 may, for example, be a single or multi-ply polyester fabric similar to the fabric used in the other belt plys. The adhesive attachment of the low friction strips 117 to the underside of the belt is completed in a vulcanizing press.

A simplified manner of constructing the composite underside 116 of the belt is to simply grind off the lower rubber cover 122 wherever a low friction strip 117 is desired to expose the low friction fabric (e.g. polyester fabric) comprising the lower ply 119. The low friction fabric of the lower ply 119 rides directly on the plenum support surface 97, is recessed slightly from the rubber cover 122 comprising the high friction strips 118, thus providing good driving contact between the strips 118 and the drive pulley 93. Alternately, high friction rubber strips 118 may be molded directly to a belt which is initially formed with a low friction layer comprising the underside of the belt.

The combination of the low friction strips 117 and the relatively narrow support surfaces 97 on the plenums results in a considerable reduction in drag and thus considerably reduced driving power requirements. For example, the belt support structure of FIGS. 6 and 7, utilizing 11 separate plenums 96 may be used to support a belt 92 having a width of 102 inches (259 cm). Each of the longitudinal belt support surface sections 124, which are separated by the vacuum distribution slot 98, may be 0.75 inch (2 cm) wide. With 11 plenums 96, the total width of the support surfaces 97 is only 16.5 inches (42 cm). This is only about 16% of the total area of the support structure underlying the conveying run 115.

The upper surface of the belt is specially configured to support the double face web 11 and to evenly distribute and control the loss of the vacuum applied to the under surface of the web. Specifically and referring also to FIGS. 9 and 10, the top surface of the belt (as the belt moves through its horizontal active conveying run 115) is provided with a pattern of discrete upstanding support elements 103. In the embodiment shown, the support elements are of a generally oblong shape in the cross machine direction. The tops of the elements are flat, lie in a common plane, and provide a web contacting surface upon which the lower liner 13 of web 11 is directly supported (see, for example, FIG. 1). The base surface 104 of the belt and the sides of the support elements 103 define an interconnected network of channels 105 through which the vacuum is distributed to the entire underside of the web 11 resting on the surfaces of the support elements 103.

It has been found to be important to minimize the widths of the channels 105 between the raised support elements 103. By limiting the maximum width of the channels to about 0.25 inch (6 mm), the tendency of the paper web 11 to be sucked down into the channels is minimized. This prevents undesirable marking of the web. The support elements 103 are sized and spaced to provide a web contacting surface area which is only about 40% of the total outer surface area of the belt 92. This results in an actual area in the channels 105 exposed to vacuum pressure of about 60%. In addition, however, the small size of the oblong support elements which may be about 0.5 inch (13 mm) long and 0.125 inch (3 mm) wide, and spaced by channels 0.125 inch (3 mm) wide have been found to have apparent edge effects which substantially increase the effective vacuum area. It is believed that the area between the flat tops of the support elements 103 and the web is evacuated to effectively increase the vacuum area to closely approach 100%. With a conveying run 115 approximately 9 feet (275 cm) in length, providing a total vacuum area of 75 square feet (7 square meters), it is possible to pull the web 11 utilizing only 0.5 to 1.0 psi (about 3.5 to 7 kPa) vacuum pressure. This low level of vacuum pressure also contributes to decreased drag between the underside 116 of the belt and the plenum support surface sections 124, lower belt tension, and longer belt life.

The belt is provided with laterally spaced lines of apertures 106, each of which lines extends the full length of the belt and overlies and is aligned with a vacuum distribution slot 98. Thus, as the belt 92 travels over the support surfaces 97 provided by the plenums, vacuum force will constantly be applied through the apertures 106, distributed throughout the network of channels 105, and provide a uniform holddown force for the web 11.

As is best shown in FIGS. 6 and 8, the apparatus of the present invention includes means for controlling the application of vacuum to the vacuum plenums 96 and to selectively seal off lateral portions of the belt surface to accommodate webs of varying widths and at the same time avoid the loss of or need to use excessive negative vacuum pressure. A vacuum distribution header 107 is used to supply negative pressure to the vacuum plenums 96 from a suction blower 53. Preferably, the system includes an odd number of vacuum plenums, including a central plenum 108 on the longitudinal centerline of the system and pairs of corresponding plenums on opposite sides of the centerline, each of which pairs is progressively more distant from the central plenum 108. See for example outermost plenum pair 109, as shown in FIGS. 6 and 7. In this manner, as a centered paperboard web 11 of a narrower width is being processed, pairs of plenums may be progressively shut off laterally inwardly from the outermost pair so that vacuum is only being applied to those plenums over which the web is traveling. As may be seen best in FIG. 6, the system is arranged such that a single control valve 110 controls the supply of negative pressure to one pair of plenums 96 supplied by a common vacuum lateral 114 connected to the header 107.

In order to prevent excess negative pressure loss, either via the lateral edges of the web or longitudinally as the belt wraps around the head or tail pulleys 93 or 94, the belt surface may be provided with a gridwork of adjoining frame sections 111. Each frame section is defined by an enclosing rib 112 projecting above the base surface 104 of the belt and having a flat outer surface 113 which lies coplanar with the web contacting surfaces of the support elements 103. The frame sections 111 are positioned in the longitudinal direction to be centered on a line of belt apertures 106. The vacuum applied to a line of apertures 106 from the plenum 96 directly below will thus be confined to the row of frame sections 111, assuming the sections are covered by a portion of the web.

On the other hand, it has been found that elimination of the ribs 112 and frame sections 111 which the ribs define may provide a beneficial cooling of the web being processed. This is because ambient air will be more readily drawn into the network of channels 105 on the belt surface 92 if there is no blocking obstruction of the frame sections 111. However, the energy requirements to generate additional compensating vacuum pressure may be increased.

We claim:

1. A vacuum assisted conveyor apparatus for moving a web of material comprising:

a continuous web transport belt including an upper conveying run underlying and supporting the web across its lateral width and a lower return run;

means for driving said belt including a drive pulley engaging the inner belt surface and providing a transition between the conveying run and the return run;

said belt having outer flat surface portions on the upper belt surface of the conveying run defining a web contacting surface, said surface portions defining therebetween open channels;

laterally spaced lines of longitudinally extending openings in said belt providing communication between the inner belt surface and said channels;

a support structure underlying the conveying run of said belt and providing sliding support for the driven belt;

said support structure including a series of parallel laterally spaced vacuum plenums defining belt support surfaces extending the length of the conveying run;

a vacuum source operatively connected to said plenums to supply negative pressure to said channels;

longitudinal vacuum distribution means in each support surface connected to said vacuum source;

one of said lines of belt openings aligned with each vacuum distribution means; and, the inner belt surface having a series of parallel laterally spaced longitudinally extending low friction strips positioned to engage said belt support surfaces, and a high friction strip positioned between each adjacent pair of said low friction strips, said high friction strips adapted to be engaged by said drive pulley.

2. The apparatus as set forth in claim 1 wherein the vacuum distribution means in each belt support surface comprises:

a longitudinal vacuum slot extending substantially the full length of the support surface;

a recessed vacuum surface in the slot below the support surface; and, a series of longitudinally spaced vacuum openings in the vacuum surface.

3. The apparatus as set forth in claim 1 wherein the total area of the belt support surfaces comprises less than about 20% of the total area of the support structure underlying said conveying run.

4. The apparatus as set forth in claim 1 including a pattern of discrete raised support elements defining the flat upper surface portions on the belt, and the spaces between said elements defining said open channels.

5. The apparatus as set forth in claim 4 wherein said open channels extend in the longitudinal and lateral direction of the belt and are interconnected.

6. The apparatus as set forth in claim 5 wherein said channels have a maximum width of about 0.25 inch.

7. The apparatus as set forth in claim 1 wherein said flat upper surface portions comprise less than about 40% of the outer surface area of the belt.

* * * * *